United States Patent [19]
Mefferd et al.

[11] 3,783,407
[45] Jan. 1, 1974

[54] IMPROVED LASER OPTICAL RESONATOR

[75] Inventors: Wayne S. Mefferd; James L. Hobart, both of Palo Alto, Calif.

[73] Assignee: Coherent Radiation Laboratories, Palo Alto, Calif.

[22] Filed: Sept. 26, 1972

[21] Appl. No.: 292,343

Related U.S. Application Data

[63] Continuation of Ser. No. 842,956, July 18, 1969, abandoned.

[52] U.S. Cl. ............................ 331/94.5 C, 330/4.3
[51] Int. Cl. .............................................. H01s 3/02
[58] Field of Search ...................... 331/94.5; 330/4.3

[56] References Cited
UNITED STATES PATENTS

| 928,902 | 7/1909 | Christie | 356/18 |
|---|---|---|---|
| 3,400,596 | 9/1968 | Laich | 331/94.5 |
| 3,440,563 | 4/1969 | Clement | 331/94.5 |
| 3,501,714 | 3/1970 | Myers et al. | 331/94.5 |
| 3,619,811 | 11/1971 | Kaiser | 331/94.5 |

OTHER PUBLICATIONS

Petru et al., Jemna Mechanika Optika, Vol. 2, 1964, pp. 38–42.

*Primary Examiner*—Ronald L. Wibert
*Assistant Examiner*—R. J. Webster
*Attorney*—J. William Wigert, Jr.

[57] ABSTRACT

The reflectors in a laser are mounted in precise axial alignment by means of an elongated mounting structure made of a material of low thermal coefficient of expansion which serves to prevent reflector misalignment due to temperature changes in the laser, the elongated mounting structure also including an associated member made of a material of high thermal conductivity which serves to direct heat away from the elongated mounting structure along the length, further reducing any temperature effects thereon. In addition, a kinematic mounting structure is provided for further enhancing the alignment stability characteristics of the plasma tube and resonator structure.

18 Claims, 15 Drawing Figures

PATENTED JAN 1 1974 3,783,407

INVENTORS
WAYNE S. MEFFERD
BY JAMES L. HOBART

Limbach and Limbach
ATTORNEYS

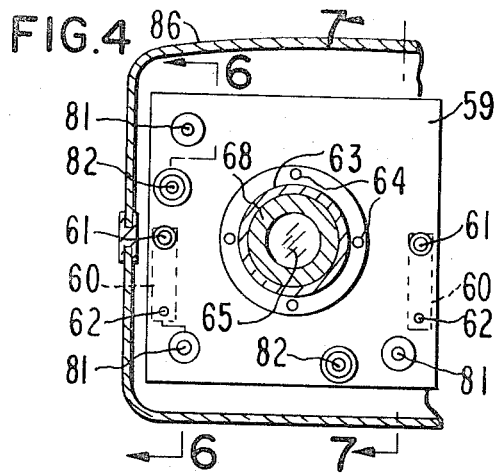
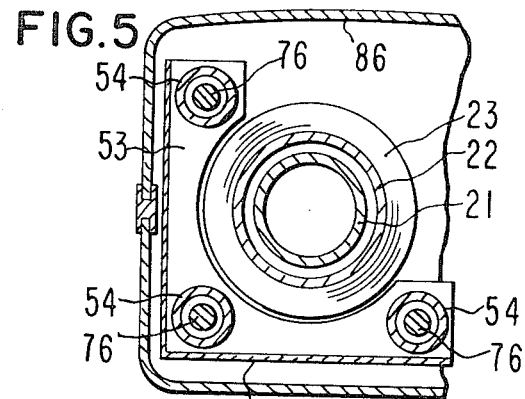
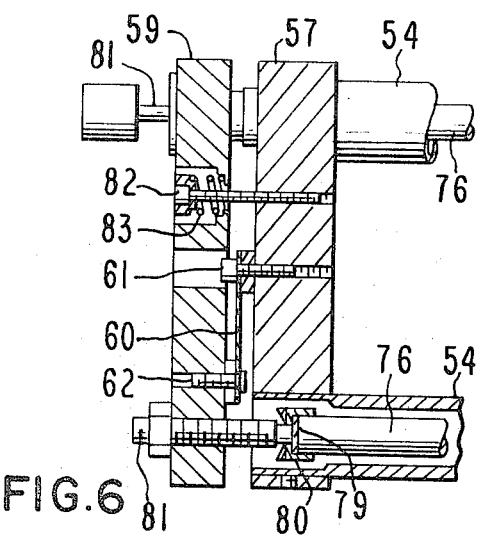
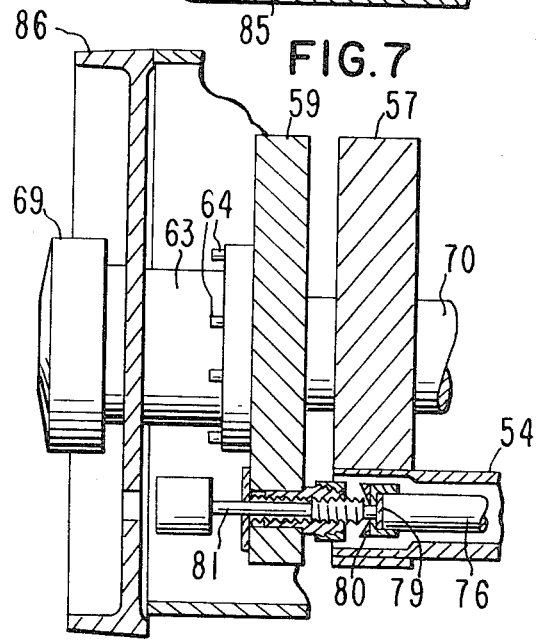
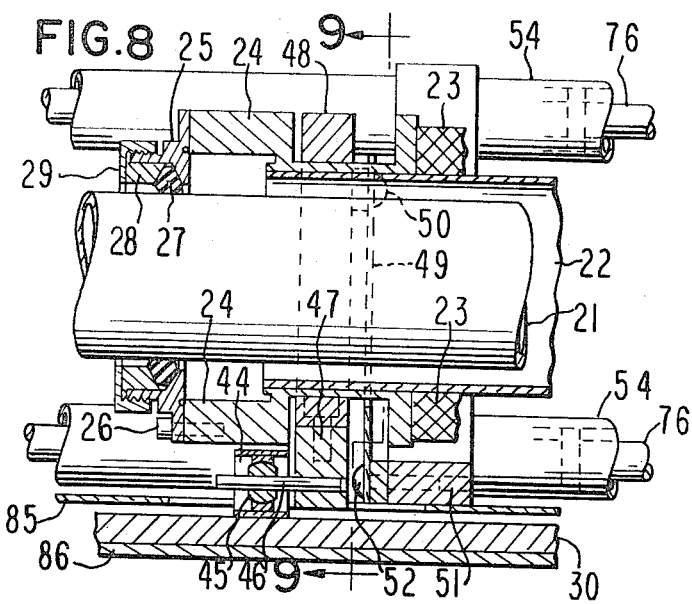
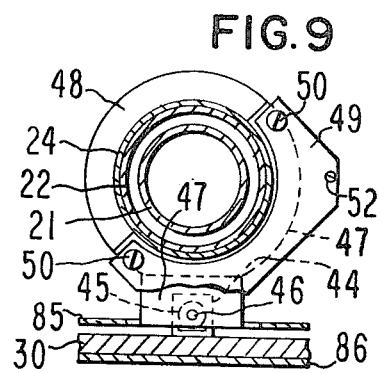

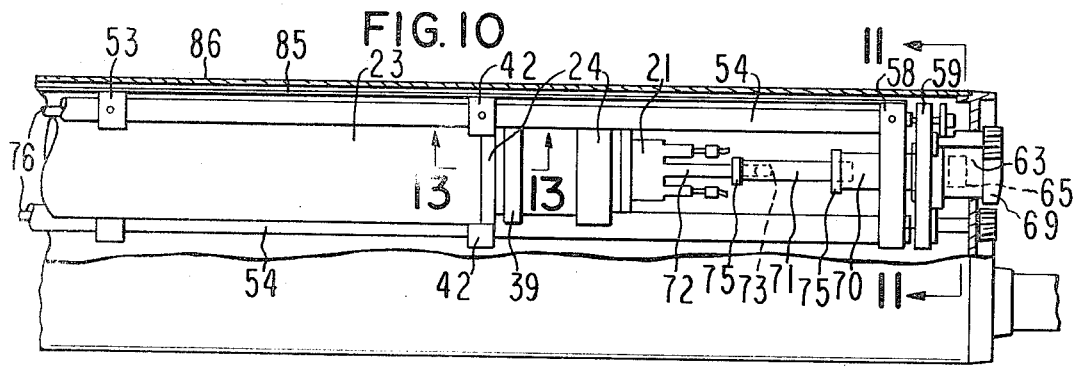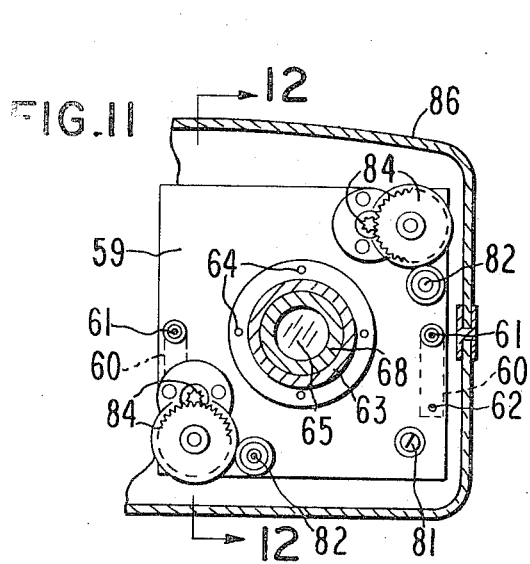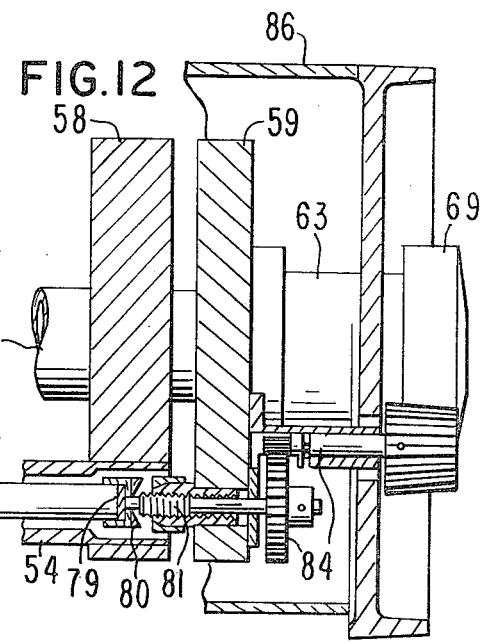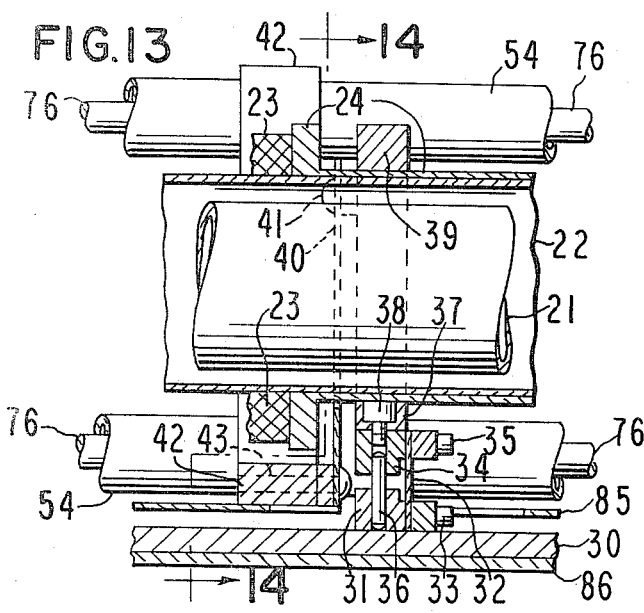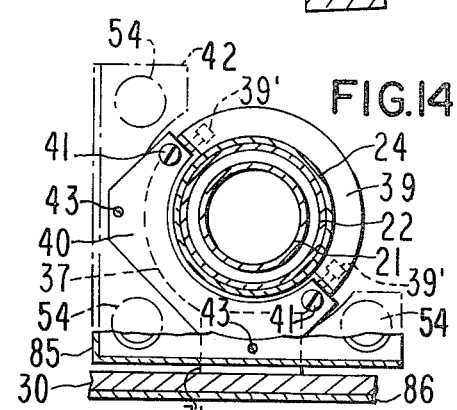

IMPROVED LASER OPTICAL RESONATOR

This is a continuation of application Ser. No. 842,956, filed July 18, 1969.

SUMMARY OF THE INVENTION

The present invention relates to a laser device and more particularly to a novel mechanism for the precise mounting and alignment of the plasma tube relative to the laser reflectors and, in addition, a novel mechanism for mounting the complete laser assembly on the main base structure.

In order to obtain optimum performance in the operation of a laser, it is necessary that there be a precise angular alignment of the resonator reflectors with the optical axis of the device. For example, in a resonator comprising two facing and parallel flat relectors, it is necessary to establish and maintain the reflectors mutually parallel to within one arc second. Misalignment produces a decrease in the level of output stability, both amplitude and frequency. In prior art devices, rigid unitary structural members have been employed to mount the laser tube and the two reflectors in precise axial alignment and, in addition, detailed coarse and fine adjustment mechanisms have been utilized to even more carefully produce such alignment in original manufacture and subsequent field use. Although solid unitary mounting structures may help to reduce misalignment due to mechanical vibrations and the like, such a structure is extremely sensitive to thermal changes during operation. For example, a thermal gradient produced transversely to such an elongated structural member will cause one side of the structure to change its length slightly relative to the length of the other side. the net effect will be a minute bending or curving of the elongated mounting structure along its length which, while causing a slight axial misalignment between the reflectors, more importantly causes a canting of one or both of the reflectors and a movement away from parallelism. A mechanical adjustment may be made to bring the reflectors back into proper alignment, but the subsequent removal or change in the value of the temperature gradient will result in further misalignment.

In accordance with one embodiment of the present invention a novel resonator mounting structure is utilized which comprises a plurality of separate, spaced apart, elongated structural units which, in their central region, carry the plasma tube and magnet structure and, at their extremeties, carry the reflector mounting and adjusting mechanisms. The mechanical arrangement of these structural units in combination with the careful selection of the materials used in the units is such as to substantially reduce the chance of misalignment during operation of the laser. One element of each of the structural units, the resonator rod which controls the reflector alignment, is made of a material having a very low coefficient of thermal expansion to reduce the effect of transverse thermal gradients while another element of each of the structural units, the resonator support tube which provides the major structural support for the resonator, is made of a material of high thermal conductivity to quickly dissipate heat from the support structure during use thereby reducing the tendency for thermal gradients to form in the support structure.

In this preferred embodiment of this novel structure, the plasma tube and magnet assembly making up the main body of the laser is held along the length upon a plurality of L-shaped support members which are secured together in longitudinally spaced-apart and fixed relationship by three hollow elongated resonator support tubes or sleeves made of aluminum, a material of high thermal conductivity. These sleeves extend beyond the L-shaped members and end plates are fixedly secured on the ends of the hollow sleeves. Reflector mounting and adjustment plates are moveable mounted by means of flexible hinges or straps on the plates. Each adjustment plate is adjustably aligned with the plasma tube and with the other adjustment plate by adjustment screws, which engage the adjustment plate and abut the ends of three elongated resonator rods extending into the three resonator sleeves, the inner ends of the resonator rods engaging a bearing member in each sleeve at approximately the center portion of the sleeves. The reflector adjustment plates are therefore, as far as the problem of alignment and positioning along the optical axis is concerned, mounted on these resonator rods which in turn are positioned from one central bearing or reference point. The resonator rods are made of a material, for example, quartz, having a low thermal expansion coefficient.

In addition to the problem of misalignment caused by thermal gradients, lack of care in the mounting of the complete laser unit on the users laboratory bench or the like may lead to misalignment of the laser elements along the optical path.

The present invention provides a novel resonator support structure to isolate to a degree the plasma tube, magnet structure and the resonator structure from the main base of the laser so that twisting or bending movements on the main base or laser casing will not be translated into misalignment movements in the optical system.

Other features and advantages of the invention will become apparent from the following description of a laser structure embodying the present invention taken in connection with the attached drawings in which:

FIG. 4 is an end view of the resonator plate structure taken along section line 4—4 of FIG. 3;

FIG. 5 is a cross-section view through the laser device taken along section line 5—5 of FIG. 1;

Figure 2:
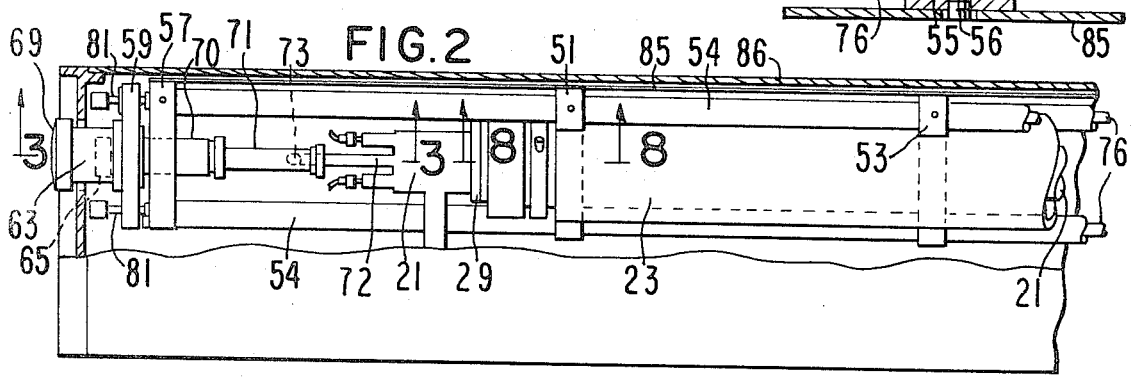
FIG. 2 is a top view of one end portion of the laser structure.
Figure 3:
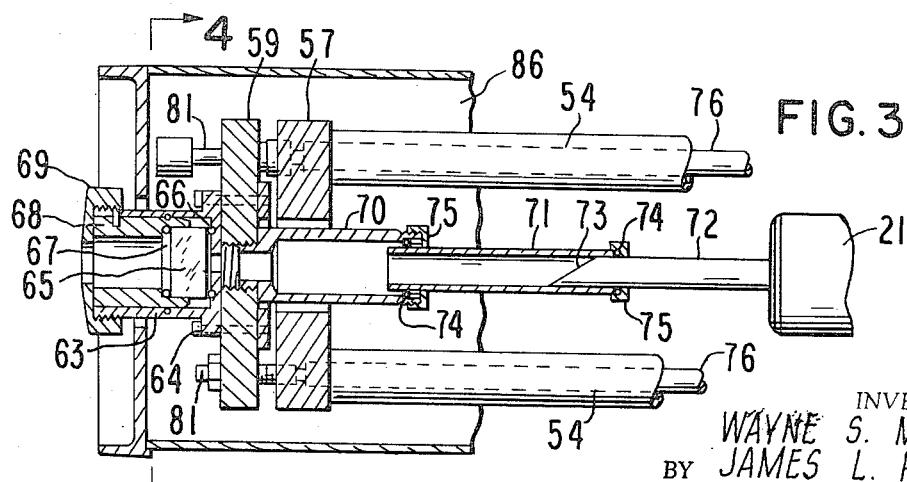
FIG. 3 is a longitudinal cross-section view of one of the resonator end plate structures of the laser taken along section line 3—3 of FIG. 2.

FIGS. 6 and 7 are longitudinal cross-section views showing the structure utilized in mounting and adjusting the resonator plate taken through section lines 6—6 and 7—7 of FIG. 4;

FIG. 8 is a longitudinal cross-section view of one of the two laser mounting devices taken along section line 8—8 of FIG. 2;

FIG. 9 is a cross-section view of the mounting structure taken along section line 9—9 in FIG. 8.

Figure 1:
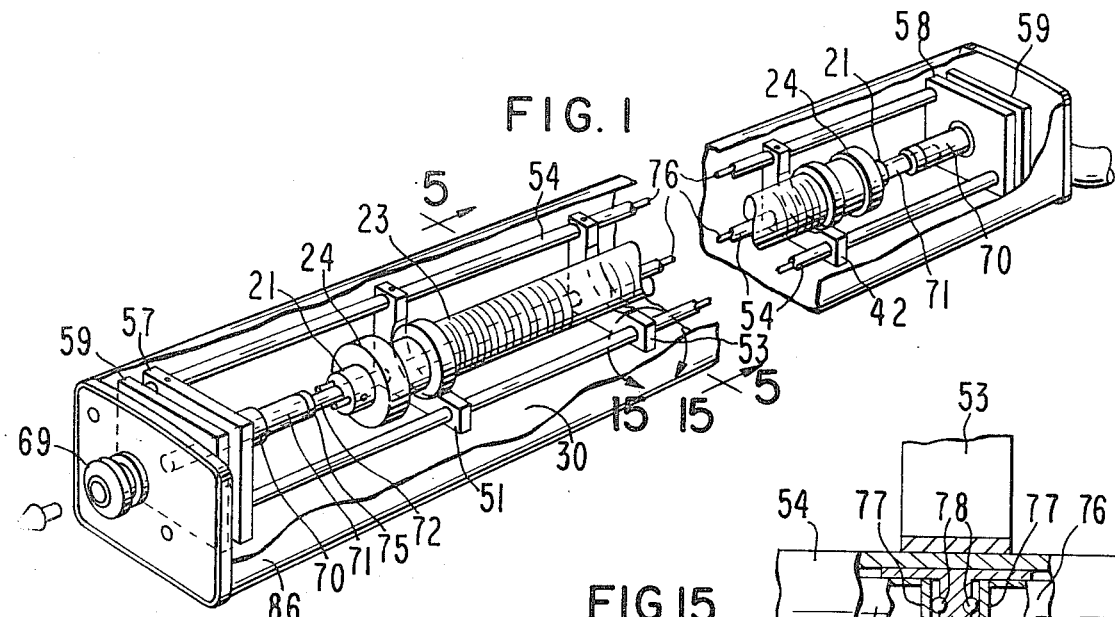
FIG. 1 is a perspective view partly broken away of a laser structure which embodies the present invention.
Figure 15:
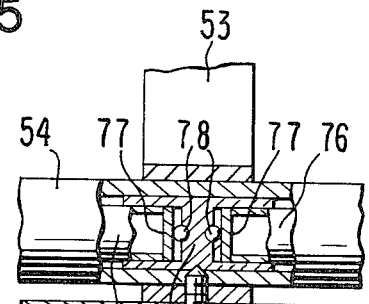

FIG. 10 is a top view, partially cut away, of the opposite end of the laser structure from that shown in FIG. 2;

FIG. 11 is a cross-section view through one end of the laser taken along section line 11—11 of FIG. 10;

FIG. 12 is a cross-section view through a portion of the resonator plate adjusting mechanism taken along section line 12—12 of FIG. II;

FIG. 13 is longitudinal cross-section view of the other laser mounting structure;

FIG. 14 is a cross-section of the mounting structure taken along section line 14—14 in FIG. 13; and FIG. 15 is a longitudinal cross-section view taken through the center portion of one of the resonator sleeves as indicated by section line 15—15 in FIG. 1.

Referring now to the drawings, the plasma tube 21 is mounted coaxially within a hollow cylindrical magnet structure consisting of the magnet tube or sleeve 22, (see FIG. 8), the solenoid 23 wound thereon, the magnet tube end members 24 affixed to the ends of tube 22 and the annular tube supports 25 secured to the end members 24 by means of screws 26. The plasma tube 21 is held within the magnet at each end by means of O rings 27, retainer rings 28 and retainer caps 29 screwed onto the ends of the tube supports 25.

This plasma tube and magnet structure are mounted on the resonator structure which in turn is mounted on the base plate 30 of the laser at two longitudinally spaced points as shown in FIGS. 8, 9, 13 and 14.

With reference to FIGS. 13 and 14, a flexure mounting base 31 is firmly secured to the base plate 30 by several screws (not shown). A flexure plate 32 is secured to the base 31 by screws 33 and a second flexure mounting member 34 is in turn secured to the flexure plate 32 by screws 35 and is aligned with the lower base 31 by a dowel pin 36 slidably extended into and between the flexure mounting members 31 and 34. A crescent-shaped cradle 37 is fixedly secured to the mounting member 34 by screws 38. The plasma tube and magnet assemble including the magnet tube end member 24 rests in the cradle 37 and is fixedly secured therein by means of a matching crescent-shaped mounting clamp 39 bolted to the cradle 37 by scres 39'. A generally crescent-shaped flexible suspension plate 40 is secured to the cradle 37 by two screws 41 located near the ends of the suspension plate. The suspension plate 40 is also secured to an L-shaped resonator support 42 by two screws 43 which are also located near the ends of the plate 40. Location of the mounting screws near the ends of plate 40 allow for greater flexibility along the length of the plate.

The second mount, shown in FIGS. 8 and 9, includes a bearing mount 44 securely affixed to the base plate 30 by screws (not shown), the mount 44 carrying a rotatable spherical bearing 45 thereon. A dowel pin 46 slidably extends through the bearing 45, the end of the dowel pin 46 being fixedly secured in a crescent-shaped support or cradle 47. The magnet tube end member 24 rests in the cradle 47 and is held therein by a mounting clamp 48. A crescent-shaped flexible suspension plate 49 is secured near its ends to the cradle 47 by means of two screws 50, the plate 49 also being secured to a second L-shaped resonator support 51 by two screws 52. Again, this flexible suspension member is free to flex over the major portion of its length; the plate 49 is made of thinner metal than the plate 40 and is therefore more flexible.

The two L-shaped resonator supports 42 and 51 mounted on the two suspension plates 40 and 49, respectively, form, along with a third L-shaped resonator support 53,(see FIG. 5) the support for the resonator assembly. These resonator supports each have openings extending longitudinally through both ends and through their corner, the three openings in each support being aligned with the openings in the other supports. Three resonator support tubes or sleeves 54 extend longitudinally through the aligned openings in the three supports 42, 51 and 53 and are secured therein; for example, with epoxy. The resonator supports and tubes are made of a material having high thermal conductivity such as, for example, aluminum which has a thermal conductivity of That is, if a plane is drawn perpendicular to and intersecting the axis of each of the resonator support sleeves 54 anywhere along their length, the points of intersection of the support sleeves 54 and the plane define a 90° angle. Consequently, two of the three planes defined by the axes of the support sleeves 54 form a right angle whose junction is along the axis of the sleeve common to both planes.

A bearing member 55 (see FIG. 15) is located in each of the three resonator tubes at the position of the middle resonator support 53, these bearings being secured in the tubes by means of set screws 56 extending through the support 53 and tubes 54. The outer ends of the three resonator support tubes 54 are fixedly secured in front and rear resonator end plates 57 and 58, respectively, which serve to mount the laser mirror structures. A front mirror adjustment plate 59 (see FIGS. 2, 3, 4, 6, and 7) is hung onto the front end plate 57 by means of two flexure hinges or hangers 60 each secured at one end to the end plate 57 by screws 61 and at their other ends to the adjustment plate 59 by screws 62 (see FIGS. 4 and 6).

A hollow cylindrical mirror housing 63 is secured to the adjusting plate 57 by cap screws 64. The transmission mirror 65 is positioned axially within the housing 63 and is held therein by means of ball bearings 66, rubber O ring 67, hollow cylindrical mirror holder 68, and the retainer nut 69 which is threaded onto the end of the housing 63.

A hollow cylindrical collet 70 (FIG. 3) is threaded into the mirror adjustment plate 59 and extends axially through the end plate 57 toward the plasma tube 21. A hollow glass flange 71 extends over the tubular end 72 and window 73 of the plasma tube 21 and into the end of the collet 70 and is held in place by O rings 74 and retainer caps or rings 75. the mirror mounting mechanism for the rear end of the laser is similar and will not be described in detail although the structural elements have been referenced on the drawings with the same reference numbers as used to describe the front end.

Three resonator rods 76 extend into the three resonator support tubes 54 through the end plates 57 from each end of the laser, the inner ends of the six rods having end plates 77 affixed thereto (see FIG. 15) which bear against the bearing member 55 via chrome moly balls 78. The resonator rods are of a material such as quartz having a very low coefficient of expansion, Since the resonator support tubes are maintained so that two of the planes formed by them are in a 90° relationship as explained previously, it is apparent that the two of the planes defined by the three rods 76 likewise bear this orthogonal relationship. The outer ends of the rods 76 each have an end plate 79 and an annular centering seat 80 firmly affixed thereto. The inner ends of three mirror adjustment plate screws 81 contact the plates 79 at the outer end of each rod 76, the screws threadably engaging the adjustment plate 59. In addition, two screws 82 and associated compression springs 83 also serve to movably fasten the adjustment plate 59 to the end plate 57. At the rear end of the laser (see FIG. 12), spur and pinion gear assemblies 84 are provided for two of the mirror plate adjustment screws 81.

An elongated L-shaped resonator stiffener plate 85 extends the length of the laser and is secured to the L-shaped supports 42, 51, and 53 and the resonator end plates 57. Additional elements of the laser not necessary to an understanding of the invention, such as power transformers, cooling water tubing and ballast assembly have not been shown. A cover or casing 86 encloses the laser.

Since the present invention is not concerned with the specifics of lasering but rather the mounting and alignment structure and since the details of lasering are so well known, no description of lasering will be given here. The present invention is concerned with establishing and maintaining the two mirrors or reflectors 65 in axial alignment with the plasma tube 21 and windows 73 and in precise parallelism with each other for reasons well known to those skilled in this art. Referring to the front end of the laser,(FIGS. 3, 4, 6 and 7) the exact positioning of the reflector 65 is controlled by the positioning of the reflector adjusting plate 59. The plate 59 is mounted on resonator end plate 57 by means of the straps 60 and screws 61 and 62, but the flexibility of this mount permits relative movement between the reflector adjustment plate 59 and the end plate 57. The fixed positioning between these plates is precisely determined by the three adjusting plate screws 81 and the associated quartz resonator rods 76 which bear at their outer ends against the screws 81 and at their inner ends against the bearing member 55 located within sleeves 54 at the center position of the laser. It can be seen, therefore, that substantially all the structural members which serve to determine the axial alignment of the reflectors over the entire longitudinal length of the laser are made of a material, i.e., quartz, which is very little effected by temperature changes in the laser during operation. In addition, the rods 76 are independent of each other, except for the fact that they contact the same mounting members at their end contact points, and temperature-induced changes in one rod 76 will not necessarily result in dependent changes in either of the other rods 76 to compound the undesired misalignment effect. Also, the rods 76 are surrounded over their entire length by sleeves 54 which are made of a material having a high thermal conductivity and thus serve, along with supports 42, 51 and 53 and resonator end plates 57, as heat sinks, acting to isolate the rods 76 from temperature variations, while acting together through their common supports 42, 51, 53 and 57 to prevent thermal gradients in the resonator support structure. Once aligned, therefore, the two reflectors 65 will stay in alignment during use over longer periods of time without attention from the operator or the service engineer, resulting in enhanced reliability and output stability, both amplitude and frequency.

Certain indirect benefits are obtained from this temperature stability, for example a reduction in the water cooling capacity needed, with a resultant reduction in water cooling structure and over-all laser weight. Also, the greater independence from thermal changes results in a reduction in the complexity of reflector adjusting structures heretofore necessary. The reflectors in the present laser may be easily and quickly removed and replaced and as a result produce easy tunability and quick conversion from all-line to single line operation.

In addition to the enhanced operation brough about by the reflector mounting structure, the novel laser mounting structure shown in FIGS. 8 and 13 provides even greater reliability and independence from undesired mechanical forces exerted on the base or body of the laser during operation. The resonator mounting including supports 42 and 51 is carried on the two cradle members 37 and 47, respectively, via the flexible suspension plates 40 and 49. The cradle members 37 and 47 are in turn carried on the base 30 via a flexure plate 32 and the dowel pin 46 and spherical bearing 45, respectively. The mechanical give provided by the flexibility of plates 40, 49, and 32, the sliding movement of dowel pin 46 and the rotational motion of bearing 45 insures that the entire resonator structure will maintain a degree of independence from bending or twisting motions of base 30. The plasma tube 21 and magnet assembly 22, 23 and 24 are all carried in the cradle members 37 and 47, held there by clamps 39 and 48, and also benefit from the structural flexibility of the cradle mounts.

While one specific embodiment of the invention has been illustrated and described in detail herein, it is obvious that many modifications thereof may be made without departing from the spirit of the invention as described in the appended claims.

What is claimed is:

1. A laser comprising an active lasing medium, means for creating a population inversion in said lasing medium, an optical resonator including a pair of reflectors aligned with each other and about the active lasing medium to form the optical beam path of the laser and for stimulating the emission of radiation along said path, a pair of reflector adjustment plates in which said reflectors are mounted, and means for accurately positioning and aligning said reflectors including at least three spaced-apart rods made of a material having a low thermal coefficient of expansion, the rods extending parallel with but displaced from the optical path, the outer ends of the rods being coupled to the reflector adjustment plates, sleeves surrounding at least a part of each of the rods and being made of a material of high thermal conductivity for minimizing thermal gradients along said rods, and means positioned along said rods for thermally coupling by thermal conduction said sleeves for minimizing thermal gradients both among and along said sleeves and said rods.

2. A laser as claimed in claim 1 wherein said sleeves are made of aluminum.

3. A laser as claimed in claim 1 wherein said thermal coupling means comprises a plurality of support members spaced-apart along the laser supporting the plurality of sleeves.

4. A laser as claimed in claim 2 including a plurality of cradle members associated with certain ones of said support members, said cradle members serving to support said active lasing medium and to equalize the temperature among the resonator rods.

5. A laser as claimed in claim 3 including a main base plate and flexure means for mounting said ones of said support members on said main base plate.

6. In a laser including an elongated plasma tube and a magnet solenoid surrounding and supporting the plasma tube, and wherein the invention comprises an improved optical resonator comprising a plurality of supports mounted in the laser and positioned in longitudinally spaced-apart relationship along said magnet solenoid, at least certain ones of said supports secured to said magnet solenoid to support the plasma tube and magnet solenoid in the laser, a plurality of sleeves made of a material of good thermal conductivity extending beyond the two furthest apart supports, a pair of resonator end plates, separate ones of the resonator end plates being mounted on each end of the plurality of sleeves, a reflector support plate movably mounted in longitudinal alignment on each resonator end plate, each reflector support plate having a reflector mounted thereon in axial alignment with the plasma tube a, bearing member positioned within each sleeve at a point between the ends of the sleeve, and a plurality of at least three resonator rods made of material of low thermal coefficient of expansion, one in each sleeve, extending from engagement at one end against the bearing member outwardly through the sleeves to engagement against the reflector support plates, said reflector support plates including adjustment means at the point of contact with the ends of the resonator rods for accurate alignment of the relfector support plate and associated reflector with the plasma tube and opposite reflector, and wherein said plurality of supports are positioned between said shields and said solenoid for providing a thermal conduction path between said sleeves for minimizing thermal gradients both along and among said sleeves and rods.

7. A laser as claimed in claim 1 wherein each of said rods are segmented and are coupled together by fixed bearings with each sleeve.

8. A laser as claimed in claim 2 wherein said rods are made of quartz.

9. A laser as in claim 6 wherein each of said rods comprises at least two sections, said sections being coupled together by bearing member positioned within each sleeve at a point between the ends of the sleeve.

10. In a laser including a lasing medium, an optical resonator comprising a pair of reflectors, at least one reflector adjustment plate in which a reflector is mounted, and wherein the improvement comprises means for accurately positioning and aligning said reflectors comprising a plurality of at least three spaced-apart rods made of a material having a low thermal coefficient of expansion, said rods extending parallel with and along the laser optical beam path, the outer ends of the rods being coupled to the reflector adjustment plate, sleeves surrounding each of the rods and being made of a material having high thermal conductivity, and means positioned along said rods for thermally coupling said sleeves by providing a thermal conduction path therebetween for minimizing thermal gradients both between and along said rods.

11. A laser as in claim 1 wherein two of the planes defined by the axes of said at least three parallel rods are orthogonal to each other.

12. A laser as in claim 6 wherein two of the planes defined by the axes of said three parallel resonator support rods are orthogonal to each other.

13. An improved optical resonator for a laser for accurately aligning and maintaining in alignment a pair of reflectors comprising:
 a. a base plate;
 b. first means for preventing misalignment of said reflectors due to temperature gradients across and along the optical resonator comprising
  i. a pair of reflector adjustment plates in which said reflectors are mounted,
  ii. three spaced-apart rods made of a material having a low thermal coefficient of expansion, wherein the rods extend parallel with but displaced from the optical beam path of the laser and the outer ends of the rods being coupled to the reflector adjustment plates,
  iii. sleeves surrounding at least a part of each of the rods and being made of a material of high thermal conductivity for minimizing thermal gradients along said rods, and
  iv. means positioned along said rods for thermally coupling by thermal conduction said sleeves for minimizing thermal gradients both among and along said sleeves and said rods; and
 c. means for mounting said sleeves to said base plate, said mounting means including second means for preventing misalignment of said reflectors due to mechanical forces exerted on said base during the operation of the laser.

14. An improved optical resonator for a laser as in claim 13 wherein said thermal coupling means comprises a plurality of support members spaced-apart along the laser supporting the plurality of sleeves.

15. An improved optical resonator for a laser as in claim 14 including a plurality of cradle members associated with certain ones of said support members, said cradle members serving to support the active lasing medium and to equalize the temperature among said rods.

16. An improved optical resonator as claim 15 wherein said second means comprises a first flexure means for mounting said cradle members on said resonator support members and second flexure means for mounting said resonator support members on said base plate.

17. An improved optical resonator as in claim 16 wherein two of the planes defined by the axes of said at least three rods are orthogonal to each other.

18. An improved optical resonator as in claim 13 wherein two of the planes defined by the axis of said at least three rods are orthogonal to each other.

* * * * *